United States Patent [19]

Ravishankar

[11] Patent Number: 5,690,728
[45] Date of Patent: Nov. 25, 1997

[54] WAY TO SYNTHESIZE STRUCTURED COMPOSITE PREMIUM PIGMENTS

[75] Inventor: Sathanjheri A. Ravishankar, Macon, Ga.

[73] Assignee: Nord Kaolin Company, Jeffersonville, Ga.

[21] Appl. No.: 582,207

[22] Filed: Jan. 2, 1996

[51] Int. Cl.[6] .................................................. C09C 1/36
[52] U.S. Cl. .......................... 106/416; 106/442; 106/446; 106/485; 106/486
[58] Field of Search ................................ 106/416, 442, 106/446, 485, 486

[56] References Cited

U.S. PATENT DOCUMENTS

| | | | |
|---|---|---|---|
| 4,105,466 | 8/1978 | Kunkle et al. | 106/309 |
| 4,874,466 | 10/1989 | Savino | 162/164.3 |
| 5,116,418 | 5/1992 | Kaliski | 106/419 |
| 5,152,835 | 10/1992 | Nemeh | 106/437 |
| 5,232,495 | 8/1993 | Shurling, Jr. et al. | 106/487 |
| 5,279,663 | 1/1994 | Kaliski | 106/406 |
| 5,312,484 | 5/1994 | Kaliski | 106/446 |
| 5,346,546 | 9/1994 | Kaliski | 106/436 |
| 5,378,399 | 1/1995 | Kaliski | 106/313.1 |
| 5,458,680 | 10/1995 | Shurling, Jr. et al. | 106/487 |

OTHER PUBLICATIONS

Steelhammer et al, "Polyaluminum Chloride Primer Revisited", PIMA, pp. 1–6, Feb. 1992.

Steelhammer, et al., PIMA, Feb. 1992, Polyaluminum Chloride Primer Revisited.

*Primary Examiner*—Melissa Bonner
*Attorney, Agent, or Firm*—Deveau, Colton & Marquis

[57] ABSTRACT

A structured composite pigment composed of $TiO_2$, calcined clay and polyaluminum chloride (PAC). A novel process is disclosed for producing an aggregated composite premium pigment having superior optical, physical and dispersion characteristics for papermaking applications. The aggregated pigment is produced by chemically aggregating a mixture containing $TiO_2$ and calcined clay with polyaluminum chloride of a basicity of 10–85% in alkaline conditions of pH 8.5–10.5.

8 Claims, No Drawings

WAY TO SYNTHESIZE STRUCTURED COMPOSITE PREMIUM PIGMENTS

BACKGROUND OF THE INVENTION

A strong market demand for titanium dioxide is continuously increasing globally. The projected demand to the cater the global need is expected to grow 4 percent in 1995 and 3 to 4 percent per year through the end of this decade. Despite announced plans by the majors producers for increasing the production of titanium dioxide, the supply will remain snug due to limitations in the operating capacity. Due to increasing demand and limited resources, price hikes could be sought by producers in an effort to recover from general inflation and to justify adding new $TiO_2$ capacity.

In order to balance the ever increasing demand and the price hikes of $TiO_2$, new technologies have emerged to substitute composite pigments of clay and titanium dioxide (also called titanium extenders) for the $TiO_2$. The major objective of making such composite pigments is primarily to reduce the consumption of $TiO_2$ and, hence the cost, without significantly sacrificing the performance in the end application.

In designing and synthesizing the composite premium pigments several physical aspects need to be considered such as the optical properties, particle size distribution, average particle size, shape, dispersion characteristics of the constituting pigments and the ability to handle the end product. Of these parameters, optical properties are the primary concern. According to Fresnel equation of reflectivity, the reflectivity F when there is an obstacle in the path way of a ray traveling in medium 1 of refractive index $n_1$ due to medium 2 of refractive index $n_2$, can be given as:

$$F = \frac{(n_1 - n_2)^2}{(n_1 + n_2)^2} . \quad [1]$$

According to Eq. [1], an increase in F, which is a crude indication of increase in the light scattering of opacifying power, may be achieved by increasing the differences between the refractive indices of medium 1 and 2. In other words, the constituting pigment materials for the composite pigment should differ in their refractive indices by a large value.

The second most elementary aspect of the composite pigment design is the particle size of the premium pigment with a high refractive index. According to the Mie theory (Mie, G., Phys. Lpz., vol 25, pp. 377, 1908), one can calculate the average particle diameter for a single spherical $TiO_2$ (rutile) particle of a refractive index of 2.7 in a matrix combination of binders, auxiliary pigments and filler materials of refractive indices of approximately 1.5 to be in the range of 0.18–0.30 µm for maximum light scattering per unit volume. With the advent of several advanced technologies, it is now possible to manufacture the $TiO_2$ particles precisely in the aforementioned particle size range. However, it is important to note that the mono-dispersed, single faceted and perfectly isometric spherical particles by virtue of their nature exhibit inferior light scattering properties. Furthermore, small $TiO_2$ particles tend to agglomerate preferentially due to relatively large Hamaker constant ($6 \times 10^{-20}$ J) and hence van der Waals attractive force between $TiO_2$ particles. The increased crowding of $TiO_2$ particles due to agglomeration is detrimental to opacity owing to the fact that the several individual light scattering sources combine to act as one via agglomeration.

Therefore, the major considerations to design a composite pigment purely from the physical optics point of view are:

a) to select a pigment material with a large refractive index value such as $TiO_2$ with the objective of achieving a maximum difference between the matrix (carrier pigment or base sheet paper) or medium (water) in which the pigment is fixated or suspended; b) to tailor-make the particle size of $TiO_2$ to yield optimum light scattering performance; and c) to space the pigment particles of high refractive index effectively to avoid optical interference and, hence, to maximize the number of light scattering sources.

In addition to physical optics, the design of composite pigments involve the selection of a carrier pigment that provides a congenial atmosphere for the strong fixation of $TiO_2$ particles without compromising the desired optical properties as discussed above. Once again, the Fresnel law provides a rough guideline for the choice of carrier pigment in terms of refractive index. Kaolins are one of the best choices that possesses optimum optical and surface characteristics for a carrier pigment. The plate like nature of the kaolin is especially advantageous to obtain the desired spacing of $TiO_2$ particles. Often, kaolins, which have been thermally bulked at 1000°–1100° C. (calcined clays), are used as a carrier pigment owing to their enhanced optical properties. Once the choice of appropriate premium pigments and pigment extenders are made, the next important step is to devise ways to aggregate the pigments.

Prior Art

A critical review of the prior art of aggregating a single pigment or more than one pigment particulates to form a composite pigment suggests several routes. First, homogenizing the surface with an inorganic dispersant and homo-coagulating with a multivalent metal ion. In this category the prior art dates half a century back when Alessandroni in U.S. Pat. No. 2,176,876 in 1938 prepared a composite pigment consisting of high refractive index pigments, such as $TiO_2$, with materials of low and medium refractive indices (1.5–2.0) such as lead carbonate and barium sulfate by coflocculating them using sodium silicate and aluminum chloride. Later, Wildt in U.S. Pat. No. 3,726,700 illustrated the method of making composite pigments consisting of $TiO_2$ particles (3–50%, by weight) and mineral extenders using an in situ formed continuous alumino-silicate gel as intrinsic cements. Kurrle in U.S. Pat. No. 4,117,191 used metal silicate, specifically, a mixture of sodium silicate and $CaCl_2$. The purpose of precipitating Ca-silicate on clay or $TiO_2$ minerals is to space the pigment matter to enhance their optical properties. Kaliski in his various U.S. Pat. Nos. 5,116,418; 5,279,663; 5,312,484; 5,346,548; 5,378,399 described a modified version of gel-setting cements for the manufacturing of structural aggregate pigments. In U.S. Pat. No. 5,116,418, Kalisli described an in situ formation of a "functional hydrosol" by reacting sodium silicate and sodium aluminate and subsequently synthesizing "microgel" by reacting the functional hydro sol with calciumions. Kaliski suggested that this in situ formed "microgel"—complex calcium aluminosilicate is capable of flocculating the particulate matter instantaneously, indiscriminately, and rapidly. In U.S. Pat. No. 5,116,418, and No. 5,279,663, Kaliski illustrated a process that structurally aggregate different hydrous clay particulates using "microgel"—an intrinsically built-in complex with functional properties. Later in U.S. Pat. Nos. 5,312,484, 5,346,546, Kaliski described the use of "microgel" in agglutinating $TiO_2$ with secondary pigmentary particles such as calcined clay and hydrous clay in such a manner to provide optical properties equivalent to pure $TiO_2$ pigments.

In the second category, the pigment particulates are directly coagulated using a bi-, tri-, or tetra-valent metal ions. Jones in WO 87/00544 used silicon tetrachloride. Later, Raythatha in U.S. Pat. No. 4,826,536 disclosed a process of aggregating fine particulate kaolin with a metal chloride having the general formula $MCl_x$, where M is Si, Al, or Ti; and x is 3 or 4 depending on the valence of M, (e.g. silicon tetrachloride), under controlled moisture environment. According to Kaythatha in U.S. Pat. No. 4,326,536, the high level of moisture in the reaction introduced through the feed causes hydrolysis of metal chlorides which resulted in an inefficient aggregation. Raythatha in U.S. Pat. No. 4,818,294 also disclosed another method of producing aggregated kaolin using organo-silicon compounds having a general formula Si (OR) where K is an alkyl group containing up to six carbon atoms. Recently, Dickey et al. in U.S. Pat. No. 5,458,680 used a similar method to produce a composite pigment of ground calcium carbonate and kaolin.

On the other hand, Pratt et al. in U.S. Pat. No. 4,738,726 and Nemeh in U.S. Pat. No. 5,152,835 used an organic polymer, namely dimethyl diallyl quaternary ammonium chloride polymer (commercially available under trademark designation Polymer 261 LV from Calgon Corporation), to flocculate kaolin and a slurry containing $TiO_2$ and calcined clay, respectively.

In the third category, in situ polymerization or condensation of one or more organic compounds mixed with the pigment particulates were used. Fadher in U.S. Pat. No. 3,453,131 used aliphatic dicarboxylic acid such as adipic acid to couple functional colloids such as carbon black to non swelling carrier day particles. The effectiveness of complexation was monitored by the turbidity of the supernatant to examine for any distinct coloration or particle phases. Simone in U.S. Pat. No. 3,912,532 describes a method to encapsulate clay particles using urea-formaldehyde condensation polymer and Economou in U.S. Pat. No. 4,346,178 used the same basic concept to produce improved light scattering properties although the structured pigments produced by Economou used much less urea-formaldehyde to produce an "open structure" with microvoids of desirable size in the product.

Bundy et al. in U.S. Pat. Nos. 4,075,941 and 4,076,548 used diamine and polyamines in mixture with citric acid to flocculate clay having particle size of 94% below 2 mm with a small quantity of mica (0.1–0.4%) as the feed material to produce high bulking day pigments. Further, Bundy et al. described in U.S. Pat. No. 4,078,030 that the calcination of the product obtained in the aforementioned patents enable additional bulking of the pigments.

All the aforesaid patents focus on achieving superior optical properties using composite pigment technologies. However, aside from optical properties, it is important to enunciate that successful commercialization of the pigments also depend on the provision of products that have acceptable fluidity when dispersed in water at practical pigment solids levels and these slurries must resist settling under static condition. For example, the pigment should be capable of being formed into a high solids slurry e.g., one containing at least 55%, preferably at least 57% pigment solids and most preferably at least 59% pigment solids. Such slurry should be sufficiently fluid to have a Brookfield viscosity (20 rpm) below 800 cps, preferably below 500 cps at 20 rpm. Unfortunately, the existing processes for making composite pigments have not been able to achieve the high solid slurries that are desirable. In addition, some of the existing composite pigments are difficult to make on a commercial basis.

SUMMARY OF THE INVENTION

It is an object of this invention to develop an composite aggregate with superior optical properties and which is capable of being formed into a high solids slurry.

It is a further object of this invention to develop a superior composite aggregate pigment that uses a large percentage of the secondary pigments with a small percentage of $TiO_2$ to produce a pigment with optical properties comparable to $TiO_2$ pigments.

It is a specific object of this invention to develop a process for producing an aggregate composite pigment with $TiO_2$ and calcined clay which has superior optical properties.

These objects have been achieved by this invention by developing a process for aggregating a small proportion of $TiO_2$ with calcined clay so as to produce a pigment with superior optical and fluidity properties.

This composite aggregate pigment is prepared by blending a slurry of titanium dioxide with a slurry of calcined day in a slurry using polyaluminum chloride (PAC). From 2 to 60.0 parts by weight of titanium dioxide is mixed with from 40 to 98 parts by weight of calcined clay in a slurry. From 0.01 to 20 parts by weight of polyalurninum chloride (PAC) is used to aggregate the pigment. This process is basically conducted by agitating in a slurry titanium dioxide and calcined clay and adding PAC liquid to it. A dispersant, such as an anionic polyelectrolyte may be added to preserve the necessary fluidity.

In place of using titanium dioxide, a mixture of titanium dioxide and other pigment materials with a high refractive index (i.e., above 2) may be used in a ratio to titanium dioxide from 10:1 to 1:10. Examples of other pigment materials with a high refractive index are zirconium oxide and zinc sulfide.

A pigment extender can be substituted for from 0.1 to 90.0% by weight of the calcined clay in the pigment, if desired. The following pigment extenders, and mixtures thereof, may be used:

a) commercially available hydrous kaolin;

b) silica, preferably obtained by ashing rice husk or hull at 400°–800° C.

c) ground calcium carbonate of particle size essentially 100% by weight, finer than 5 μm e.s.d.

d) precipitated calcium carbonate of a particle size which is essentially 100% by weight finer than 5 μm e.s.d.

e) needle-shaped wollastonite particles, which may either be synthetic or natural, having an aspect ratio of from 5:1 to 2:1 of the length of the particle to its diameter.

One of the following auxiliary pigments can be substituted for from 0.1 to 5 parts by weight of the calcined clay in the mixture:

a) carbon, preferably obtained by adding rice husk or hull at 400°–800° C;

b) synthetic aluminosilicate spheres with a hollow core of from approximately 1–25 μm outer diameter and 0.01 to 10 μm core diameter.

It has been found that the auxiliary pigment described in b) improves the flow characteristics of the slurry when it has a high viscosity.

The term polyaluminum chloride (PAC) is defined to include aluminum chlorohydrate and mixtures of polyaluminum chloride and aluminum chlorohydrate. The PAC should have basicity of between 10 and 90% and preferably between 40% and 90%. In place of utilizing polyaluminum chloride, a mixture of polyaluminum chloride with aluminum chlorohydrate can be substituted for the polyaluminum chloride in a 10:1 to 1:10 ratio. If desired, various bivalent and multivalent inorganic salts can be substituted in this process.

The pigment product of this invention is a structural aggregate of titanium dioxide, and calcined clay, using PAC.

This composition is useful as a pigment for paper, paint, and plastic and other coating applications. The composition of this invention is basically a substitute for titanium dioxide pigments in that it possesses comparable optical and fluidity characteristics.

DESCRIPTION OF THE PREFERRED EMBODIMENTS

The composite pigment of this invention can be used for coating applications on paper and plastic and for the preparation of paint. This composite pigment has high hiding and light scattering properties.

This composite aggregate pigment is prepared by mixing in a slurry from 2 to 60 parts by weight of titanium dioxide with from 40–98 parts by weight of calcined clay and from 0.1 to 20 parts by weight of polyaluminum chloride (PAC). Preferably, the $TiO_2$ is present in an amount from 20 parts to 50 parts by weight and the calcined clay is present in an amount of 50 parts to 80 parts by weight and PAC in an amount from 0.1 to 10 parts by weight. It may be necessary to add a dispersant to the slurry in order to preserve the necessary fluidity and low viscosity necessary to produce the pigment.

The preferred particulate $TiO_2$ (rutile, anatase and brookite) materials used in preparing the composite pigment under discussion can be of the following types or blends thereof in any proportions and combinations:

a) $TiO_2$ pigments sold commercially as rutile and anatase products, having essentially 100%, by weight, of particle size finer than 2 μm; 98–99% finer than 1.5 μm; 97.5–98.0% finer than 1.0 μm; 30–35% finer than 0.3 μm in equivalent spherical diameter (e.s.d.).

b) precipitated $TiO_2$ particles that are commercially available.

In place of using titanium dioxide, a mixture of titanium dioxide with other pigment materials having a high refractive index (i.e., above 2), such as zirconium oxide and zinc sulfide, may be used in a 10:1 to 1:10 ratio.

The calcined days are basically prepared by heating kaolin in the range of 1000° to 1100° C. It is preferred that the calcined clays have a particle size finer than 3 μm e.s.d. with approximately 90% of the calcined clays having a particle size finer than 2 μm e.s.d.. It is preferred that the average equivalent spherical diameter be between 0.4–0.8 μm.

From 0.1 to 90% by weight of one of the following pigment extenders may be substituted for a portion of the calcined clay in the mixture:

a) commercially available hydrous kaolin.

b) silica, preferably obtained by ashing rice husk or hull at 400°–800° C.

c) ground calcium carbonate of a particle size which is essentially 100% by weight finer than 5 μm e.s.d.

d) precipitated calcium carbonate of a particle size which is essentially 100% by weight finer than 5 μm e.s.d.

e) needle-shaped wollastonite particles, which may either be synthetic or natural, having an aspect ratio of from 5:1 to 2:1 of the length of the particle to its diameter.

The hydrous kaolin has a very fine particle size where its largest particles are about 80% by weight, finer than 2 μm e.s.d., 65% by weight, finer than 1 μm e.s.d., 40% by weight finer than 0.4 μm e.s.d. These pigment extenders can be used either alone or in a mixture thereof. These pigment extenders may be used to achieve the desired optical or physical properties of the pigment and also to reduce costs.

One of the following auxiliary pigments can be substituted for from 0.1 to 5% by weight of the calcined clay in the mixture:

a) carbon, preferably obtained by adding rice husk or hull at 400°–800° C.;

b) synthetic aluminosilicate spheres with a hollow core of from approximately 1–25 μm outer diameter and 0.01 to 10 μm core diameter.

It has been found that the auxiliary pigments described in b) improves the flow properties of the slurry when it has a high viscosity.

The slurry of $TiO_2$ and calcined day is chemically structured by adding a polyaluminum chloride to the slurry during mixing. The term PAC also includes aluminum chlorohydrate and mixtures of polyaluminum chloride with aluminum chlohydrate in a 10:1 to 1:10 ratio. The weight of the PAC is determined after conducting a microwave drying process (@20% power of a CEM microwave oven). Model AVC-80 was used in the preparation of these pigments.

The PAC should have a degree of neutralization, namely the molar ratio, or the basicity as defined by following relationship:

$$\% \text{ Basicity} = \frac{[OH]}{3*[Al]} *100, \qquad [2]$$

between 10% to 90%.

A slurry obtained by mixing at least one form of particulate titanium dioxide and calcined clay can render a loose blend of solids of at least 1–64%, by weight, and preferably in the 55–62% range, and most preferably, in the 58–62% range. The pH of the above said loose blend can be obtained naturally in the range of 4–12, or can be adjusted using a standard inorganic acid such as HCl or $H_2SO_4$ and alkali such as NaOH or $NaHCO_3$, $Na_2CO_3$. It is, however, preferred to maintain the pH in the range of 7–11, and most preferably in the range of 8.5–10.5.

The preferred process for synthesizing the composite pigments of the present invention include the addition of PAC in an amount of 0.01 to 20 parts, by weight, as determined by the microwave drying process with the PAC having at least one degree of neutralization, or a basicity (as defined by the relationship in Eq. [2]) between 10% to 90%. Preferably, the basicity is between 25% and 90%. From 0.01 parts to 20 parts, by weight, can be used of aluminum chlorohydrate or a mixture of polyaluminum chloride with aluminum chlorohydrate in a ratio of 10:1 to 1:10 ratio.

Optionally, 0.01 to 4 parts, by weight of bi or polyvalent metal cations selected from periodic table group IIa, IIb, IIIa, VIa, and VIb can be added to enhance the aggregation kinetics.

The exact mechanism of rapid aggregation of the negatively charged $TiO_2$ and the calcined clay is quite complex. However, because of the fact that PAC contains multinuclear polyvalent cationic species with the most dominating polymeric species with a chemical formula being $Al_{13}O_4(OH)_{24}^{7+}$ (Steelhammer et al. PIMA February 1992), the instantaneous coagulation may be attributed to the charge neutralization of surface negative charges of $TiO_2$ and calcined clay in the presence PAC. Nonetheless, it is surprising that the aggregation of the pigments using PAC produces the necessary optical properties combined with the desired handling properties.

Thus, the addition of PAC thickens the colloidal suspension as a result of strong coagulation, e.g., Brookfield viscosity exceeds 1000 cps at 20 rpm. To convert the thick suspension into a fluid of rather manageable form, additional dispersant, essentially anionic polyelectrolytes, can be added. The mount of dispersant should be such that a fluid system having solid content of at least 55%, by weight, with Brookfield viscosity under 1000 cps at 20 rpm in the pH range of 7–10 is obtained as the final product.

In a presently preferred embodiment of the invention, a slurry of loose blend containing 35–45 parts (solids) $TiO_2$ and 55–65 parts (solids) calcined clay was prepared and blended at 200 rpm. The pH of the loose blend was adjusted in the range of 7.0 to 11.0, preferably between 8.5 to 10.5 with sodium hydroxide and conditioned for about ten minutes at 750–800 rpm. To the resultant mixture, the required amount, typically 1–1.2 parts, by weight of the as received polyaluminum chloride liquid was added slowly. During addition, the slurry begins to form a viscous fluid which on continued addition becomes even thicker. At this point a small amount of dispersant will improve the shear thinning property of the slurry. However, as a role of thumb, the thicker the slurry gets before a dispersant is added the better it is for the final product in terms of optical properties. The addition of dispersant was continued to get the desired Brookfield viscosity of 500–700 cps. If the dispersant is added before the PAC is added to the slurry, poor optical properties are normally obtained. It is thought that the addition of the PAC before the dispersant is added results in the neutralization of the surface negative charge on the calcined clay and $TiO_2$. This facilitates the attractive forces between the $TiO_2$ and the calcined clay producing rapid coagulation.

Typical properties of the pigments prepared by the present invention have the following properties:

| COMPOSITE PIGMENT PROPERTIES | |
|---|---|
| Constituents | |
| Wt. Ratio of $TiO_2$/calcined clay | 5/95 to 50/50 |
| Optical characteristics | |
| G. E. Brightness | 94 to 97 |
| Scattering Coefficient @ 4 g/m² | 0.44 to 0.51 @ 457 μm |
| Mylar Opacity @ 7 lb/3300 ft² | 86.5 to 88.2 |
| Particle size | |
| % Finer than 2 mm | 95% |
| Median diameter | 0.40 to 0.45 μm |
| Slurry properties | |
| % Solids | 59 to 61 |
| +325 mesh residue, wt % | less than 0.3%, by wt |
| Viscosity Specifications | |
| Brookfield Viscosity, cps @ 20 rpm | 400–700 @ 59–61% solids by weight |
| after one week | 600–800 @ 59–61% solids by weight |
| after two weeks | 600–800 @ 59–61% solids by weight |

The pigment slurry, thus made by a batch or continuous process, exhibits sufficient shear stability to withstand production and handling conditions using conventional commercial processing equipment and also is adequately stable for use in high speed coaters used by paper industry. Optionally, the composite pigment particles can be removed by conventional drying processes, preferably by flash or spray drying technique.

The particle size analyses reported in this invention are estimated by the Sedigraph 5100 particle size analyzer as equivalent spherical diameters (e.s.d.) on a weight percentage basis. In the example, test results were obtained essentially according to the following TAPPI (Technical Association of the Pulp and Paper Industry) procedures:

75° gloss-TAPPI Standard using T480A om-85.
B&L opacity-TAPPI Standard T425 om-86
G.E. brightness-TAPPI Standard T452 om-87

Light scattering studies were determined on the pigments in some instances using black glass as the model substrates (Kaliski, A., in Journal of Technical Association of the Pulp and Paper Industry (TAPPI), Vol. 53, No. 11, November 1970, pages 2077–2084 ("Performance of Some Clays in Starch Containing Paper-Coating Films; Part I. Black Glass Plates as Model Substrates"). This was done by coating a pigment slurry containing 48% solids, by weight, with 2% latex suspensions onto a black glass plate at a coat weight of 2.0–6.0 μm² (expressed as dry pigment). The reflectance of the coatings after air drying is measured at wavelengths 457 nm and 577 nm by means of an Elrepho reflectometer. The reflectance values are converted by the use of Kubelka-Munk equations to light scattering coefficients (m²/g). The light scattering coefficients give an indication of the opacifying potential of the pigment, vis-à-vis the degree of bulking of the composite pigment. The higher the values of light scattering coefficients, the rarer is the light passing through the pigment coating or the larger is the reflected and back scattered light. Reflectance is measured at two different wavelengths. The wavelengths 457 nm and 577 nm correspond to the wavelength used in the TAPPI brightness and opacity measurements, respectively. The ratio of these light scattering coefficients ($\rho = SC_{577}/SC_{457}$) is directly related to coarse nature of the coating structure below certain binder-volume fraction which corresponds to 5–8%, by weight. At a constant binder-volume fraction the increase in "$\rho$" is an indication of improved light scattering properties of the pigments.

The opacity measurements were made by coating the pigment @50% solids on a transparent polyester film, used for overhead projection, (Labelon Co., Canandaigua, N.Y.) of thickness specified as 4 mil at 4–5 different coat weights using various wire wound coating rods. The coatings were dried overnight in a controlled environment complying to TAPPI standards (50% humidity; 23° C. ambient temperature). Using a 3"×7" template, the middle portion of the coatings was isolated and several opacity measurements were made and averaged using a BNL-2 Opacimeter according to TAPPI Standard T425 om-86. The resultant opacity vs coat weight plot was interpolated to 7.0 lb/3300 ft² coat weight for comparison and reported as acetate opacity in the tables.

In preparing coating colors for light weight coating, a standard formulation has been used with conventional additives or mixtures with the aggregate composite pigment slurry of the present invention. Typically coating colors for light weight coatings are obtained by mixing premium pigments, primary coating pigments, binder materials such as casein, soybean proteins, starches (dextrins, oxidized starches) rubber lattices, styrene butadiene copolymer latex and synthetic polymeric resin emulsions such as derived from acrylic and vinylacetates.

The coating color compositions prepared in accordance with the present invention can be applied to base sheets in a conventional manner. This is one of the salient features of the pigments of this invention.

The pigments of this invention can be used as substitutes for $TiO_2$ pigments. The pigments of this invention have optical and physical properties comparable to $TiO_2$ pigments. These pigments may be used in paints and coatings requiring good hiding and light scattering characteristics.

Having now fully described this invention, it will be apparent to one of ordinary skill in the art that may changes and modifications can be made thereto without departing from the spirit or scope of this invention as set forth herein.

The coating colors containing the composite pigments prepared in the following examples were tested by applying using a CLC 6000 coating machine on a base stock of weight 27 lbs/3300 ft$^2$ (Weyerhaeuser Paper Co) at the following set-up:

| Speed FPM | 3500 |
|---|---|
| Blade | 0.015" |
| Blade Extension | 0.4" |
| Backing Blade | 0.125" |
| Blade angle | 50° |
| Shutter height | 2.0" |
| Predry Time (Sec)/Power (HP) | 25/80 |
| Postdry Time (sec)/Power (HP) | 30/100 |

The coated sheets were calendered to a gloss value of 52–55 in 2 nips @1500 psi and 135°–155° F.

EXAMPLE 1

In the following examples, the pigments of this invention were prepared from a master batch of blended slurry containing slurries of 3383.82 g (1800 g dry) calcined clay (Norcal®) obtained from Nord Kaolin Co. Jeffersonville, Ga.) and 1572.8 g (1200 g dry) TiO$_2$ pigments from SCM Co.

EXAMPLE 1(a)

826.0g. (500.0 g dry) of blended slurry containing 40% TiO$_2$ and 60% calcined clay, by weight, was agitated in a drill press at 200 rpm for 10 min. The pH of the slurry was measured and then the agitation was increased to 750 rpm. To the resultant slurry, 5.975 g (23.9 lb/Ton) as received PAC liquid from Geo Chemicals, Syracuse, N.Y. of Sp. Gr.=1.195 and % solids=33% was added slowly. While the addition continued, the viscosity of the slurry begins to increase, forming a viscous mass, and further thickens with prolonged addition. At this point, it is necessary to add a small amount of dispersant Rohm & Haas 9400 (R&H 9400 obtained from Kohm & Haas Co. North Olmsted, Ohio) to increase the fluidity or lower the viscosity of the slurry. Once the slurry becomes fluid, the addition of PAC was continued until the slurry becomes viscous once again. As mentioned before, the addition of small amount of dispersant was made once again to improve the fluidity of the slurry. This process was repeated until the entire amount of PAC liquid was added. After mixing the slurry for ten minutes, the Brookfield viscosity measurements were made and adjusted to 500–700 cps @20 rpm by adding dispersant (R & H 9400). The percent solids and pH were measured and the slurry was stored in a plastic bottle.

EXAMPLE 1(b)

826.0 g. (500.0 g dry) of blended slurry containing 40% TiO$_2$ and 60% calcined clay, by weight, was worked in a drill press at 750 rpm for 10 min. To the resultant slurry, 5.975 g (23.9 lb/Ton, calculated on a dry basis) as received PAC liquid of Sp. Gr.=1.195 and % solids=33% was added slowly. When the addition continues, the slurry becomes a viscous mass and thickens with further addition. At this point, a small amount of sodium silicate was added from a 5% sodium silicate solution to increase the dispersion of the slurry. Once the slurry becomes fluid, the addition of PAC was continued until the slurry becomes viscous once again. Once again, the addition of sodium silicate commences when the slurry becomes viscous. The process of coagulating with PAC and dispersing with sodium silicate was repeated until the entire amount of PAC liquid was consumed. The amount of sodium silicate added was 5 lb/Ton. After mixing the slurry for ten minutes, the Brookfield viscosity measurements were made and adjusted to 500–700 cps @20 rpm by adding a dispersant (R & H 9400). The percent solid content and pH were measured and the slurry was stored in a plastic bottle.

TABLE 1

Effect of Sodium Silicate

| # | PIGMENT | PAC* (lb/Ton) | Sod. Sil. lb/Ton | pH of L-B | SC$_{457}$ (@4 g/m$^2$) | Final pH | Final Solids (%) |
|---|---|---|---|---|---|---|---|
| 1 | Loose Blend (L-B) | — | — | 6.7 | 0.38 | 7.4 | 60.53 |
| 2 | Example 1a | 23.9 | — | 6.7 | 0.4674 | 5.7 | 59.31 |
| 3 | Example 1b | 23.9 | 5 | 6.7 | 0.4409 | 5.5 | 58.61 |

Notes:
*Basicity of the PAC is 45–55%
SC$_{457}$: Scattering Coefficient at 457 nm Shown in Table 1 are the scattering coefficients of the pigment layer coated on a black glass obtained at 457 nm in the presence of PAC and sodium silicate. Usually, the increase in the black glass scattering coefficients is an indication of enhanced light scattering property of the pigments and also a good tool to identify if there is any bulking of the pigments. It is clear from Table 1 that the light scattering coefficients were lower for the loose blend compared to Ex. 1a and 1b, showing that PAC enhances the light scattering properties of the pigments.

EXAMPLE 2

In the following examples, the pigments of this invention were prepared from a master batch of blended slurry containing slurries of 3383.82 g (1800 g dry) calcined clay (Norcal®) and 1558.8 g (1200 g dry) TiO$_2$ pigments from TiOxide Co.

EXAMPLE 2(b) & 2(b)

828.36 g. (500.0 g dry) of blended slurry containing 40% TiO$_2$ and 60% calcined clay, by weight, was agitated in a drill press at 750 rpm for 10 min. The pH of the slurry was adjusted to the desired value (see Table 2) using 5% solution of sodium hydroxide and agitated at 750 rpm for 10 min. To the resultant slurry, 5.975 g (23.9 lb/Ton) as received PAC liquid of Sp. Gr.=1.195 and % solids=33% was added slowly. While the addition continued, the viscosity of the slurry begins to increase, forming a viscous mass, and further thickens with further addition. At this point, it is necessary to add a small amount of dispersant (R & H 9400) to increase the fluidity or lower the viscosity of the slurry. Once the slurry becomes fluid, the addition of PAC was continued until the slurry gets viscous once again. As mentioned before, the addition of small amount of dispersant was made once again to improve the fluidity of the slurry. This process was repeated until the entire amount of PAC liquid was added. After mixing the slurry for ten minutes, the Brookfield viscosity measurements were made and adjusted to 500–700 cps @20 rpm by adding a dispersant (R & H 9400). The percent solid content and pH were measured and the slurry was stored in a plastic bottle.

TABLE 2

Effect of pH

| # | PIGMENT | PAC (lb/Ton) | pH of L-B | Acetate Opacity (@7 lb/ 3300 ft$^2$) | SC$_{457}$ (@4 g/m$^2$) | Final Solids (%) | Final pH |
|---|---|---|---|---|---|---|---|
| 1 | 2(a) | 23.9 | 6.7 | 86.63 | 0.4186 | 59.36 | 5.6 |
| 2 | 2(b) | 23.9 | 8.45 | 87.49 | 0.4712 | 59.64 | 6.45 |
| 3 | Loose blend (L-B) | — | 6.7 | 81–82 | 0.37–0.38 | 60.36 | 6.7 |

Note:
Basicity of the PAC is 45–55%
SC$_{457}$: Scattering Coefficient at 457 nm It is surprising to note that the results indicate that adjusting the pH of the loose blend to an alkaline pH before adding PAC is beneficial to the light scattering properties and opacity of the pigment.

9400). The total amount of dispersant (R & H 9400) added during the process is 6.2 g (12.4 lb/Ton). The percent solid content and pH were measured and slurry was stored in a plastic bottle.

EXAMPLE 3(b)

1643.66 g. (1000.0 g dry) of blended slurry containing 40% TiO$_2$ and 60% calcined clay, by weight, was agitated in a drill press at 750 rpm for 10 min. The pH of the slurry was adjusted to 8.6 using sodium hydroxide while agitating at 750 rpm for 10 min. To the resultant slurry, 6.4 g (12.4 lb/Ton) of K & H 9400 polyelctrolyte dispersant was added. This is followed by the addition of 11.9 g (23.9 lb/Ton) of as received PAC liquid of Sp. Gr.=1.195 and % solids=33% in a slow manner. While the addition continued, the viscosity of the slurry begins to increase, forming a viscous mass, and further thickens with prolonged addition. However, it was not necessary to add any dispersant to adjust the Brookfield viscosity since the viscosity was obtained in the 500–700 cps range @20 rpm. The percent solid content and pH were measured and the slurry was stored in a plastic bottle.

TABLE 3

Sequence of PAC and Dispersant Addition

| # | PIGMENT | PAC (lb/Ton) | Dispersant R & H 9400 (lb/Ton) | pH of L-B | Acetate Opacity (@7 lb/3300 ft$^2$) | SC$_{457}$ (@4 g/m$^2$) | Final pH | Hercules Viscosity @18 dynes | Final Solids (%) |
|---|---|---|---|---|---|---|---|---|---|
| 1 | loose blend (L-B) | — | — | 6.7 | 81–82 | 0.37–0.38 | — | — | 60.84 |
| 2 | Example 3(a) | 23.9 | 12.4 | 8.6 | 88.13 | 0.4700 | 6.2 | 300 rpm | 60.10 |
| 3 | Example 3(b)* | 23.9 | 12.4 | 8.6 | — | 0.4350 | 6.9 | 400 rpm | 60.65 |

Notes:
*dispersant was added before adding PAC
Basicity of the PAC is 45–55%
SC$_{457}$: Scattering Coefficient at 457 nm

EXAMPLE 3

In the following examples, the pigments of this invention were prepared from a master batch of blended slurry containing slurries of 5606.43 g (3000 g dry) Norcal® (calcined clay) and 2640.61 g (2000 g dry) TiO$_2$ pigments from TiOxide Co.

EXAMPLE 3(a)

1643.66 g. (1000.0 g dry) of blended containing 40% TiO$_2$ and 60% calcined clay, by weight, was agitated in a drill press at 750 rpm for 10 min. The pH of the slurry was adjusted to 8.6 using sodium hydroxide while agitating at 750 rpm for 10 min. To the resultant slurry, 11.9 g (23.9 lb/Ton) of as received PAC liquid from Geo Chemicals, Syracuse, N.Y. of Sp. Gr.=1.195 and % solids=33% was added slowly. While the addition continued, the viscosity of the slurry begins to increase, forming a viscous mass, and further thickens with prolonged addition. At this point, it is necessary to add a small amount of dispersant (R & H 9400) to increase the fluidity or lower the viscosity of the slurry. Once the slurry becomes fluid, the addition of PAC was continued until the slurry gets viscous once again. As mentioned before, the addition of small amount of dispersant was made once again to improve the fluidity of the slurry. This process was repeated until the entire amount of PAC liquid was added. After mixing the slurry for ten minutes, the Brookfield viscosity measurements were made and adjusted to 500–700 cps @20 rpm by adding a dispersant (R & H From example 3(a) and 3(b), it is very clear that the addition of dispersant as a precursor to complexation is certainly not advantageous to optical properties as indicated by the poor black glass scattering values. However, it is interesting to note comparable viscosity and other physical properties in Example 3(a) and 3(b). It appears that the complexation between discrete charge sites of the particle surface is more favorable for bulking than when it occurs between the charges on the polymeric dispersants coated on the particles.

In summary, the studies conducted thus far indicate the importance of conditioning the loose blend at alkaline pH, the detrimental nature of sodium silicate, and the deleterious effect caused by the inverting the sequence of addition of the PAC and the dispersant. With this background, an elaborate study was conducted to investigate the effect of pH and PAC dosage. This investigation was conducted with the aim of optimizing the operating variables namely pH and PAC dosage.

EXAMPLE 4

In the following examples, the pigments of this invention were prepared from a master batch of blended slurry containing slurries of 22317 g (12000 g dry) Norcal® (calcined clay) and 10526.7 g (8000 g dry) UDR-606 TiO$_2$ pigments from Kemira Co. A detailed study has been conducted on varying the pH from 8.5 to 10.5 and dosage of PAC from 17.9 lb/Ton to 29.9 lb/Ton.

EXAMPLE 4(a)

2489.6 g. (1500.0 g dry) of blended slurry containing 40% TiO$_2$ and 60% calcined day, by weight, was agitated in a drill press at 750 rpm for 10 min. The natural pH of the loose slurry was 8.6. To the resultant slurry, 13.4 g (17.9 lb/Ton) of as received PAC liquid of Sp. Gr.=1.195 and % solids=33% was added slowly. While the addition continued, the viscosity of the slurry begins to increase, forming a viscous mass, and further thickens with prolonged addition. At this point, it is necessary to add a small mount of dispersant (R & H 9400) to increase the fluidity or lower the viscosity of the slurry. Once the slurry becomes fluid, the addition of PAC was continued until the slurry gets viscous once again. As mentioned before, the addition of small mount of dispersant was made once again to improve the fluidity of the slurry. This process was repeated until the entire amount of PAC liquid was added. After mixing the slurry for ten minutes, the Brookfield viscosity measurements were made and adjusted to 500–700 cps @20 rpm by adding a dispersant (R & H 9400). The percent solid content and pH were measured and the slurry was stored in a plastic bottle.

EXAMPLE 4(b)

2489.6 g. (1500.0 g dry) of blended slurry containing 40% $TiO_2$ and 60% calcined clay, by weight, was agitated in a drill press at 750 rpm for 10 min. The pH of the loose slurry was adjusted to 10.35 using sodium hydroxide. To the resultant slurry, 17.93 g (23.9 lb/Ton) of as received PAC liquid of Sp. Gr.=1.195 and % solids=33% was added slowly. While the addition continued, the viscosity of the slurry begins to increase, forming a viscous mass, and further thickens with prolonged addition. At this point, it is necessary to add a small mount of dispersant (R & H 9400) to increase the fluidity or lower the viscosity of the slurry. Once the slurry becomes fluid, the addition of PAC was continued until the slurry becomes viscous once again. As mentioned before, the addition of small amount of dispersant was made once again to improve the fluidity of the slurry. This process was repeated until the entire amount of PAC liquid was added. After mixing the slurry for ten minutes, the Brookfield viscosity measurements were made and adjusted to 500–700 cps @20 rpm by adding a dispersant (K & H 9400). The percent solid content and pH were measured and the slurry was stored in a plastic bottle.

EXAMPLE 4(c)

2489.6 g. (1500.0 g dry) of blended slurry containing 40% $TiO_2$ and 60% calcined clay, by weight, was agitated in a drill press at 750 rpm for 10 min. The natural pH of the loose slurry was 8.6. To the resultant slurry, 22.4 g (29.9 lb/Ton) of as received PAC liquid of sp. Gr.=1.195 and % solids=33% was added slowly. While the addition continued, the viscosity of the slurry begins to increase, forming a viscous mass, and further thickens with prolonged addition. At this point, it is necessary to add a small amount of dispersant (R & H 9400) to increase the fluidity or lower the viscosity of the slurry. Once the slurry becomes fluid, the addition of PAC was continued until the slurry gets viscous once again. As mentioned before, the addition of small mount of dispersant was made once again to improve the fluidity of the slurry. This process was repeated until the entire mount of PAC liquid was added. After mixing the slurry for ten minutes, the Brookfield viscosity measurements were made and adjusted to 500–700 cps @20 rpm by adding a dispersant (R & H 9400). The percent solid content and pH were measured and the slurry was stored in a plastic bottle.

EXAMPLE 4(d)

2489.6 g. (1500.0 g dry) of blended slurry containing 40% $TiO_2$ and 60% calcined clay, by weight, was agitated in a drill press at 750 rpm for 10 min. The pH of the loose slurry was adjusted to 9.5 using sodium hydroxide. To the resultant slurry, 22.4 g (29.9 lb/Ton) of as received PAC liquid of sp. Gr.=1.195 and % solids=33% was added slowly. While the addition continued, the viscosity of the slurry begins to increase, forming a viscous mass, and further thickens with prolonged addition. At this point, it is necessary to add a small mount of dispersant (R & H 9400) to increase the fluidity or lower the viscosity of the slurry. Once the slurry becomes fluid, the addition of PAC was continued until the slurry gets viscous once again. As mentioned before, the addition of small mount of dispersant was made once again to improve the fluidity of the slurry. This process was repeated until the entire mount of PAC liquid was added. After mixing the slurry for ten minutes, the Brookfield viscosity measurements were made and adjusted to 500–700 cps @20 rpm by adding a dispersant (K & H 9400). The percent solid content and pH were measured and the slurry was stored in a plastic bottle.

TABLE 4

Effect of pH and PAC Dosage

| # | PIG-MENT | PAC (lb/Ton) | pH of L-B | Acetate Opacity (@7 lb/ 3300 Ft$^2$) | $SC_{457}$ (@4 g/m$^2$) | Final pH | Final Solids (%) |
|---|---|---|---|---|---|---|---|
| 1 | loose blend (L-B) | — | 8.65 | 81–82 | 0.37–0.38 | 8.65 | |
| 2 | Example 4(a) | 17.9 | 8.65 | 87.41 | 0.4585 | 7.4 | 60.02 |
| 3 | Example 4(b) | 23.9 | 10.35 | 87.83 | 0.4668 | 8.0 | 59.30 |
| 4 | Example 4(c) | 29.9 | 8.65 | 87.56 | 0.4541 | 6.9 | 59.79 |
| 5 | Example 4(d) | 29.9 | 9.50 | 87.59 | 0.4593 | 7.4 | 59.57 |

Table 4 demonstrates that the addition of PAC increases the opacity and light capturing coefficients of pigments formed from $TiO_2$ and calcined clay by a significant amount. Increasing the amount of PAC added within the range set forth in Table 4 does not seem to have a significant effect upon the light scattering coefficient or opacity. Likewise, increasing the basicity of the slurry does not seem to have a significant effect upon the opacity and light scattering coefficient of the pigment produced.

EXAMPLE 5

In the following examples, the pigments of this invention were prepared using aluminum chlorohydrate (ACH) of basicity (as defined in Eq. [2]) 83% at 23.9 lb/Ton.

1691.88 g. (1000.0 g dry) of blended slurry containing 40% $TiO_2$ and 60% calcined clay, by weight, was agitated in a drill press at 750 rpm for 10 min. The pH of the loose slurry was adjusted to 11.0 using 12.4g of 25% sodium hydroxide solution. To the resultant slurry, 18.0 g (23.9 lb/Ton) of as received aluminum chlorohydrate (PAC with basicity>80%) liquid from Geo Chemicals, Syracuse, N.Y. of Sp. Gr.=1.35 and % solids=50% was added slowly. While the addition continued, the viscosity of the slurry begins to increase, forming a viscous mass, and further thickens with prolonged addition. At this point, it is necessary to add a small amount of dispersant (R & H 9400) to increase the fluidity or lower the viscosity of the slurry. Once the slurry becomes fluid, the addition of aluminum chlorohydrate was continued until the slurry gets viscous once again. As mentioned before, the addition of small mount of dispersant was made once again to improve the fluidity of the slurry. This process was repeated until the entire mount of PAC liquid was added. After mixing the slurry for ten minutes, the Brookfield viscosity measurements were made and adjusted to 500–700 cps @20 rpm by adding a dispersant (R & H 9400). The percent solid content and pH were measured and the slurry was stored in a plastic bottle.

TABLE 5

Effect of Basicity of PAC

| # | PIGMENT | PAC (lb/Ton) | Basicity of the Comp. Agent % | pH of L-B | Acetate Opacity (@7 lb/3300 Ft$^2$) | SC$_{457}$ (@4 g/m$^2$) | Final pH | Final Solids (%) |
|---|---|---|---|---|---|---|---|---|
| 1 | loose blend (L-B) | — | | 8.65 | 81–82 | 0.37–0.38 | 8.65 | — |
| 2 | Example 5(a) | 23.9 | 80–90 | 10.6 | 88.95 | 0.5484 | 8.0 | 60.07 |
| 3 | Example 4(b) | 23.9 | 45–55 | 10.35 | 87.83 | 0.4668 | 8.0 | 59.37 |

Table 5 demonstrates very surprising results on the increase of the opacity and light scattering coefficient of the composite aggregate pigments with the increase in the basicities of PAC.

EXAMPLE 6

Four different composite pigments (6(a)–(d)) were prepared according to the procedure described in the example 4(b) with varying basicities of the PAC. The pigments, thus made, were then subjected to Light Weight Coating (LWC) studies on a base stock of 27 lb/3300 ft$^2$ (Weyerhaeuser Paper Co.) using a cylindrical laboratory coater (CLC 6000 by Sensor & Simulation products, Weyerhaeuser, Tacoma, Wash.) to evaluate their optical performance on a coated sheet.

Controls were UDR 606 (Kernira Co.) and RPS (Dupont) at 100%, by weight. In all the colors, composite pigments were used in the amount of 5.5 parts by weight. The remaining 94.5 parts by weight consists of delaminated kaolin (Norcote DL) and hydrous kaolin (Norcote II) in 3:1 ratio. On the other hand, the control TiO$_2$ pigments were used in 5 parts with remaining 95 parts being delaminated kaolin (Norcote DL, obtained from Nord Kaolin Co. Jeffersonville, Ga.) and hydrous kaolin (Norcote II,, obtained from Nord Kaolin Co. Jeffersonville, Ga.) in 3:1 ratio. The other ingredients that are added during the color preparation are:

a) 8 parts of PC 280, hydroxy ethylated starch from Penford Products, b) 8 parts of CP 620 NA, styrerie butadiene latex from Dow chemicals Corp., c) 1 part of Sunkote 450, Calcium stearate emulsion, Sequa chemicals Inc., Chester, S.C., d) 0.3 parts of Sunrez 700M, cyclic amide aidehyde condensation product—an Insolubilizer from Sequa Chemicals Inc., Chester, S.C., and e) 0.1 parts of colloids 211, Sodium polyacrylate solution from Colloids Inc., Newark, N.J.

All the coating colors were made at 57.5±0.2% solids and coated at three different coat weights on a base stock of 27 lbs/3300 ft$^2$ obtained from Weyerhauser Paper Co. The coated sheets were calendered at 150° F. to a gloss of 51±2 using two nips@1500 psi.

The optical properties of the coated sheet were evaluated at three different coat weight and interpolated at 5.5 lb/3300 ft$^2$ and reported in Table 6.

TABLE 6

Cylindrical Laboratory Coater Results

| # | PIGMENT | Basicity (%) | Coated sheet Opacity (@ 5.5 lbs/3300 ft$^2$) | Brightness (%) | Gloss (%) |
|---|---|---|---|---|---|
| 1 | 6(a) | >80 | 82.80 | 71.12 | 49.52 |
| 2 | 6(b) | 45–55 | 82.91 | 71.13 | 49.71 |
| 3 | 6(c) | 25–40 | 82.29 | 70.83 | 52.82 |
| 4 | 6(d) | 0 | 82.52 | 70.96 | 51.22 |
| 5 | UDR 606 | NA | 83.14 | 71.52 | 51.66 |
| 6 | RPS | NA | 83.49 | 71.39 | 50.99 |

As is clear from Table 6, these results are quite significant considering the fact that the pigments examples 6(a) to (d) in this invention contain only 40% of TiO$_2$ (UDR 606 from Kemira Co.). Besides superior optical performance, the composite pigments produced in this invention can be shipped at higher solids content up to 61% and at least 59% without having any undesirable settling effect. This is one of the salient features of these pigments compared to other similar composite pigments available commercially.

What is claimed is:

1. A chemically aggregated kaolin based composite after removal from the slurry in which it was produced useful as a pigment comprising:

(a) from 2 to 60 parts by weight of particulate titanium dioxide;

(b) from 4 to 97.9 parts by weight of calcined clay;

(c) from 0.04 to 88.2 parts by weight of a pigment extender selected from the group consisting of:

(i) hydrous kaolin;

(ii) silica;

(iii) ground calcium carbonate of particle size essentially 100% by weight finer than 5 μm e.s.d.;

(iv) precipitated calcium carbonate of a particle size which is essentially 100% by weight finer than 5 μm e.s.d.;

(v) needle-shaped woolastonite particles, with an aspect ratio of from 5:1 to 2:1 of the length of the particle in relation to its diameter; and (d) from 0.01 to 20 parts by weight of polyaluminum chloride (PAC) with a degree of basicity as defined by the following relationship:

$$\% \text{ Basicity} = \frac{[OH]}{3*[Al]} *100,$$

of between 10 and 90%;

wherein the sum of the amount of said calcined clay in parts, by weight, and the amount of said pigment extender in parts, by weight, is from 40 to 98 parts, by weight.

2. A chemically aggregated kaolin based composite after removal from the slurry in which it was produced useful as a pigment comprising:
   (a) from 2 to 60 parts by weight of particulate titanium dioxide;
   (b) from 38 to 97.9 parts by weight of calcined clay;
   (c) from 0.04 to 4.9 parts by weight of an auxiliary pigment selected from the group consisting of:
      (i) carbon;
      (ii) synthetic aluminosilicate spheres with a hollow core of from approximately 1–25 μm outer diameter and 0.01 to 10 μm core diameter; and
   (d) from 0.01 to 20 parts by weight of polyaluminum chloride (PAC) with a degree of basicity as defined by the following relationship:

$$\% \text{ Basicity} = \frac{[OH]}{3*[Al]} *100,$$

of between 10 and 90%;

wherein the sum of the amount of said calcined clay in parts, by weight, and the amount of said auxiliary pigment extender in parts, by weight, is from 40 to 98 parts by weight.

3. A slurry containing a chemically aggregated kaolin based composite useful as a pigment; said slurry containing a blend of solids comprising:
   (a) from 2 to 60% by weight of solids of particulate titanium dioxide;
   (b) from 38 to 97.9% by weight of solids of calcined clay;
   (c) from 0.04 to 4.9% by weight of solids of an auxiliary pigment selected from the group consisting of:
      (i) carbon; and
      (ii) synthetic aluminosilicate spheres with a hollow core of from approximately 1–25 μm outer diameter and 0.01 to 10 μm core diameter; and
   (d) from 0.01 to 20% by weight of polyaluminum chloride (PAC) with a degree of basicity as defined by the following relationship:

$$\% \text{ Basicity} = \frac{[OH]}{3*[Al]} *100,$$

in which the polyaluminum chloride (PAC) has a degree of basicity of between 10 and 90%;

wherein the sum of the amount of said calcined clay in %, by weight, and the amount of said auxiliary pigment in %, by weight, is from 40 to 98%, by weight.

4. A slurry containing a chemically aggregated kaolin based composite useful as a pigment; said slurry containing a blend of solids comprising:
   (a) from 2 to 60% by weight solids of particulate titanium dioxide;
   (b) from 4 to 97.9% by weight solids of calcined clay;
   (c) from 0.04 to 88.2% by weight solids of a pigment extender selected from the group consisting of:
      (i) hydrous kaolin;
      (ii) silica;
      (iii) ground calcium carbonate of particle size essentially 100% by weight, finer than 5 μm e.s.d.;
      (iv) precipitated calcium carbonate of a particle size which is essentially 100% by weight finer than 5 μm e.s.d.;
      (v) needle-shaped woolastonite particles, with an aspect ratio of from 5:1 to 2:1 of the length of the particle in relation to its diameter; and
   (d) from 0.01 to 20% by weight solids of polyaluminum chloride (PAC) with a degree of basicity as defined by the following relationship:

$$\% \text{ Basicity} = \frac{[OH]}{3*[Al]} *100,$$

of between 10 and 90%;

wherein the sum of the amount of said calcined clay in %, by weight, and the amount of said auxiliary pigment in %, by weight, is from 40 to 98%, by weight.

5. A method for producing a chemically aggregated kaolin based composite useful as a pigment comprising preparing a slurry by mixing in water the following compositions in a percentage by weight of solids:
   (a) from 2 to 60% by weight of solids of particulate titanium dioxide:
   (b) from 38 to 97.9% by weight of solids of calcined clay;
   (c) from 0.04 to 4.9% by weight of an auxiliary pigment selected from the group consisting of:
      (i) carbon;
      (ii) synthetic aluminosilicate spheres with a hollow core of from approximately 1–25 μm outer diameter and 0.01 to 10 μm core diameter; and
   (d) from 0.01 to 20% by weight of polyaluminum chloride (PAC) with a degree of basicity as defined by the following relationship:

$$\% \text{ Basicity} = \frac{[OH]}{3*[Al]} *100,$$

of between 10 and 90%;

wherein the sum of the amount of said calcined clay in %, by weight, and the amount of said auxiliary pigment in %, by weight, is from 40 to 98% by weight.

6. A method for producing a chemically aggregated kaolin based composite useful as a pigment comprising preparing a slurry by mixing water in the following compositions in a percentage, by weight, of solids; as follows:
   (a) from 2 to 60% by weight of particulate titanium dioxide;
   (b) from 4 to 97.9% by weight of calcined clay;
   (c) from 0.04 to 88.2% by weight of a pigment extender selected from the group consisting of:
      (i) hydrous kaolin;
      (ii) silica;
      (iii) ground calcium carbonate of particle size essentially 100% by weight finer than 5 μm e.s.d.;
      (iv) precipitated calcium carbonate of a particle size which is essentially 100% by weight finer than 5 μm e.s.d.;
      (v) needle-shaped woolastonite particles, with an aspect ratio of from 5:1 to 2:1 of the length of the particle in relation to its diameter; and
   (d) from 0.01 to 20% by weight of polyaluminum chloride (PAC) with a degree of basicity as defined by the following relationship:

$$\% \text{Basicity} = \frac{[OH]}{3*[Al]} *100,$$

of between 10 and 90%;
wherein the sum of the amount of said calcined clay in parts, by weight, and the amount of said pigment extender in parts, by weight, is from 40 to 98% by weight.

7. A continuous method for producing a chemically aggregated kaolin based composite useful as a pigment comprising mixing, in water to form a slurry, of the following compositions a percentage, by weight of solids, as follows:
   (a) from 2 to 60% by weight of particulate titanium dioxide;
   (b) from 38 to 97.9% by weight of calcined clay;
   (c) from 0.04 to 4.9% by weight of an auxiliary pigment selected from the group consisting of:
      (i) carbon;
      (ii) synthetic aluminosilicate spheres with a hollow core of from approximately 1–25 μm outer diameter and 0.01 to 10 μm core diameter; and
   (d) from 0.01 to 20% by weight of polyaluminum chloride (PAC) with a degree of basicity as defined by the following relationship:

$$\% \text{Basicity} = \frac{[OH]}{3*[Al]} *100,$$

of between 10 and 90%;
wherein the sum of the amount of said calcined clay in %, by weight, and the amount of said pigment extender in %, by weight, is from 40 to 98% by weight.

8. A continuous method for producing a chemically aggregated kaolin based composite useful as a pigment comprising mixing in water to form a slurry of the following compositions a percentage, by weight of solids, as follows:
   (a) from 2 to 60% by weight of particulate titanium dioxide;
   (b) from 4 to 97.9% by weight of calcined clay:
   (c) from 0.04 to 88.2% by weight of a pigment extender selected from the group consisting of:
      (i) hydrous kaolin;
      (ii) silica;
      (iii) ground calcium carbonate of particle size essentially 100% by weight, finer than 5 μm e.s.d.;
      (iv) precipitated calcium carbonate of a particle size which is essentially 100% by weight finer than 5 μm e.s.d.;
      (v) needle-shaped woolastonite particles, with an aspect ratio of from 5:1 to 2:1 of the length of the particle in relation to its diameter; and
   (d) from 0.01 to 20% by weight of polyaluminum chloride (PAC) with a degree of basicity as defined by the following relationship:

$$\% \text{Basicity} = \frac{[OH]}{3*[Al]} *100,$$

of between 10 and 90%;
wherein the sum of the amount of said calcined clay in %, by. weight, and the amount of said pigment extender in %, by weight, is from 40 to 98% by weight.

* * * * *